United States Patent
Van Pelt (10) Patent No.: US 12,270,514 B1
(45) Date of Patent: Apr. 8, 2025

(54) METHODS AND SYSTEMS TO DETERMINE LIQUID NATURAL GAS (LNG) COMPOSITION AND DENSITY

(71) Applicant: United Launch Alliance, L.L.C., Centennial, CO (US)

(72) Inventor: John Pieter Van Pelt, Lakwood, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 190 days.

(21) Appl. No.: 18/062,897

(22) Filed: Dec. 7, 2022

(51) Int. Cl.
  *F17C 6/00* (2006.01)
  *B64G 5/00* (2006.01)
  *F17C 13/02* (2006.01)

(52) U.S. Cl.
  CPC ............... *F17C 6/00* (2013.01); *B64G 5/00* (2013.01); *F17C 13/02* (2013.01); *F17C 2201/0109* (2013.01); *F17C 2201/032* (2013.01); *F17C 2201/054* (2013.01); *F17C 2223/0161* (2013.01); *F17C 2225/0161* (2013.01); *F17C 2250/034* (2013.01); *F17C 2250/0421* (2013.01); *F17C 2250/0443* (2013.01); *F17C 2250/0615* (2013.01); *F17C 2250/0636* (2013.01); *F17C 2250/0689* (2013.01); *F17C 2260/022* (2013.01); *F17C 2270/0197* (2013.01)

(58) Field of Classification Search
  CPC ............... F17C 6/00; F17C 13/02; B64G 5/00
  See application file for complete search history.

(56) References Cited

U.S. PATENT DOCUMENTS

| 3,933,030 | A | 1/1976 | Forster et al. |
| 7,360,563 | B2 * | 4/2008 | Mitlitsky ............... F17C 13/026 141/2 |
| 9,885,447 | B2 | 2/2018 | Drube et al. |
| 10,900,822 | B1 * | 1/2021 | Blackmon ............. G01F 23/268 |
| 2006/0180236 | A1 * | 8/2006 | Hoke, Jr. ................. F17C 13/02 141/94 |

(Continued)

FOREIGN PATENT DOCUMENTS

| CN | 105782716 | 7/2016 |
| CN | 214094026 | 8/2021 |
| EP | 3786514 | 3/2021 |

(Continued)

OTHER PUBLICATIONS

Duan et al., "Effects of natural gas composition and compression ratio on the thermodynamic and combustion characteristics of a heavy-duty lean-burn SI engine fueled with liquefied natural gas," Fuel, vol. 254, No. 115733, Jul. 1, 2019, 13 pages.

(Continued)

Primary Examiner — Jason K Niesz
(74) Attorney, Agent, or Firm — Sheridan Ross P.C.

(57) ABSTRACT

Embodiments disclosed herein are directed to controlling the fueling process for a space launch vehicle based on a composition of a Liquefied (LNG) propellant being loaded onto the space launch vehicle. According to one embodiment, controlling a fueling process for a launch vehicle can comprise monitoring a flow of a fuel being loaded into a tank of the launch vehicle during the fueling process. Loading of the fuel into the tank of the launch vehicle can then be controlled based on the determined mass of the fuel and a predefined mass loading target for the fuel.

17 Claims, 6 Drawing Sheets

(56) References Cited

U.S. PATENT DOCUMENTS

2019/0226640 A1    7/2019   Belgacem-Strek et al.
2020/0209153 A1    7/2020   Sakai et al.

FOREIGN PATENT DOCUMENTS

| JP | S62-156197 | 7/1987 | |
|---|---|---|---|
| JP | H10-048115 | 2/1998 | |
| JP | 2004-149617 | 5/2004 | |
| JP | 2014-106098 | 11/2012 | |
| JP | 5221326 | 6/2013 | |
| KR | 2002-90522 | 9/2002 | |
| WO | WO-0167052 A1 * | 9/2001 | ............... G01F 1/84 |
| WO | WO 2020/195120 | 10/2020 | |

OTHER PUBLICATIONS

McTaggart-Cowan et al., "Impacts and Mitigation of Varying Fuel Composition in a Natural Gas Heavy-Duty Engine," SAE International Journal of Engines, vol. 10, No. 4, Oct. 2017, pp. 1506-1517.

* cited by examiner

METHODS AND SYSTEMS TO DETERMINE LIQUID NATURAL GAS (LNG) COMPOSITION AND DENSITY

FIELD OF THE DISCLOSURE

Embodiments of the present disclosure relate generally to methods and systems for controlling a fueling process for a space launch vehicle and more particularly to controlling the fueling process for a space launch vehicle based on a composition of a Liquefied Natural Gas (LNG) propellant being loaded onto the space launch vehicle.

BACKGROUND

Liquefied (LNG) is a common propellant used in space launch vehicles. Typically, liquid propellants are loaded onto launch vehicles based on volume, i.e., based on a volumetric loading target. However, LNG is a cryogenic propellant with multiple components in solution. The ratios of those components and the composition of the solution varies with temperature and other factors. These changes significantly affect the weight and loading of the launch vehicle as well as operation of the engine. Loading of the propellant based on a volumetric loading target cannot address these variations. Hence, there is a need for improved methods and systems for controlling a fueling process for a space launch vehicle.

BRIEF SUMMARY

Embodiments of the disclosure provide systems and methods for controlling the fueling process for a space launch vehicle based on a composition of a Liquefied (LNG) propellant being loaded onto the space launch vehicle. According to one embodiment, a method for controlling a fueling process for a launch vehicle can comprise monitoring, by a processor of a control system, a flow of a fuel being loaded into a tank of the launch vehicle during the fueling process. Monitoring the flow of the fuel being loaded into the tank of the launch vehicle can comprise reading, from a spectroscopic or chromographic analyzer, at a periodic time interval, raw composition values for the fuel. Monitoring the flow of the fuel being loaded into the tank of the launch vehicle can also comprise detecting a flow rate for the fuel being loaded into the tank of the launch vehicle.

The processor of the control system can determine a mass of the fuel being loaded into the tank of the launch vehicle based on the monitoring of the flow of the fuel into the tank. Determining the mass of the fuel being loaded into the tank of the launch vehicle can comprise determining, in real-time, a time dependent composition value for each of a plurality of components of the fuel based on the raw composition values for the fuel and the flow rate for the fuel being loaded into the tank of the launch vehicle. Determining the mass of the fuel being loaded into the tank of the launch vehicle can further comprise determining, in real-time, density term for the fuel being loaded into the tank of the launch vehicle based on the time dependent composition value for each of the plurality of components of the fuel and calculating the mass of the fuel being loaded into the tank of the launch vehicle based on the density term.

The processor of the control system can then control the loading of the fuel into the tank of the launch vehicle based on the determined mass of the fuel and a predefined mass loading target for the fuel. Controlling the loading of the fuel into the tank of the launch vehicle based on the determined mass of the fuel and a predefined mass loading target for the fuel can comprise calculating, in real-time, a total mass of the fuel loaded into the tank of the launch vehicle based on the density term and the flow rate of the fuel being loaded into the tank of the launch vehicle and determining whether the total mass of the fuel loaded into the tank of the launch vehicle is equal to or greater than the predetermined mass loading target. In response to determining the total mass of the fuel loaded into the tank of the launch vehicle is equal to or greater than the predetermined mass loading target, a flow rate for the fuel being loaded into the vehicle can be adjusted.

In some cases, the processor of the control system can also determine final composition values of the fuel loaded into the tank of the launch vehicle. In such cases, the processor of the control system can provide the final composition values for the fuel loaded into the tank of the launch vehicle to a flight control system of the launch vehicle.

According to another embodiment, a control system for controlling a fueling process for a launch vehicle can comprise a processor and a memory coupled with and readable by the processor. The memory can store therein a set of instruction which, when executed by the processor, causes the processor to monitor a flow of a fuel being loaded into a tank of the launch vehicle during the fueling process. Monitoring the flow of the fuel being loaded into the tank of the launch vehicle can comprise reading, from a spectroscopic or chromographic analyzer, at a periodic time interval, raw composition values for the fuel. Monitoring the flow of the fuel being loaded into the tank of the launch vehicle can also comprise detecting a flow rate for the fuel being loaded into the tank of the launch vehicle.

The instructions can further cause the processor to determine a mass of the fuel being loaded into the tank of the launch vehicle based on the monitoring of the flow of the fuel into the tank. Determining the mass of the fuel being loaded into the tank of the launch vehicle can comprise determining, in real-time, a time dependent composition value for each of a plurality of components of the fuel based on the raw composition values for the fuel and the flow rate for the fuel being loaded into the tank of the launch vehicle. Determining the mass of the fuel being loaded into the tank of the launch vehicle can further comprise determining, in real-time, density term for the fuel being loaded into the tank of the launch vehicle based on the time dependent composition value for each of the plurality of components of the fuel and calculating the mass of the fuel being loaded into the tank of the launch vehicle based on the density term.

The instructions can further cause the processor to control the loading of the fuel into the tank of the launch vehicle based on the determined mass of the fuel and a predefined mass loading target for the fuel. Controlling the loading of the fuel into the tank of the launch vehicle based on the determined mass of the fuel and a predefined mass loading target for the fuel can comprise calculating, in real-time, a total mass of the fuel loaded into the tank of the launch vehicle based on the density term and the flow rate of the fuel being loaded into the tank of the launch vehicle and determining whether the total mass of the fuel loaded into the tank of the launch vehicle is equal to or greater than the predetermined mass loading target. In response to determining the total mass of the fuel loaded into the tank of the launch vehicle is equal to or greater than the predetermined mass loading target, a flow rate for the fuel being loaded into the vehicle can be adjusted.

In some cases, the instructions can further cause the processor to determine final composition values of the fuel loaded into the tank of the launch vehicle. In such cases, the instructions can also cause the processor to provide the final composition values for the fuel loaded into the tank of the launch vehicle to a flight control system of the launch vehicle.

According to yet another embodiment, a non-transitory, computer-readable medium can comprise a set of instructions stored therein which, when executed by the processor, causes the processor to control a fueling process for a launch vehicle by monitoring a flow of a fuel being loaded into a tank of the launch vehicle during the fueling process. Monitoring the flow of the fuel being loaded into the tank of the launch vehicle can comprise reading, from a spectroscopic or chromographic analyzer, at a periodic time interval, raw composition values for the fuel. Monitoring the flow of the fuel being loaded into the tank of the launch vehicle can also comprise detecting a flow rate for the fuel being loaded into the tank of the launch vehicle.

The instructions can further cause the processor to determine a mass of the fuel being loaded into the tank of the launch vehicle based on the monitoring of the flow of the fuel into the tank. Determining the mass of the fuel being loaded into the tank of the launch vehicle can comprise determining, in real-time, a time dependent composition value for each of a plurality of components of the fuel based on the raw composition values for the fuel and the flow rate for the fuel being loaded into the tank of the launch vehicle. Determining the mass of the fuel being loaded into the tank of the launch vehicle can further comprise determining, in real-time, density term for the fuel being loaded into the tank of the launch vehicle based on the time dependent composition value for each of the plurality of components of the fuel and calculating the mass of the fuel being loaded into the tank of the launch vehicle based on the density term.

The instructions can further cause the processor to control the loading of the fuel into the tank of the launch vehicle based on the determined mass of the fuel and a predefined mass loading target for the fuel. Controlling the loading of the fuel into the tank of the launch vehicle based on the determined mass of the fuel and a predefined mass loading target for the fuel can comprise calculating, in real-time, a total mass of the fuel loaded into the tank of the launch vehicle based on the density term and the flow rate of the fuel being loaded into the tank of the launch vehicle and determining whether the total mass of the fuel loaded into the tank of the launch vehicle is equal to or greater than the predetermined mass loading target. In response to determining the total mass of the fuel loaded into the tank of the launch vehicle is equal to or greater than the predetermined mass loading target, a flow rate for the fuel being loaded into the vehicle can be adjusted.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
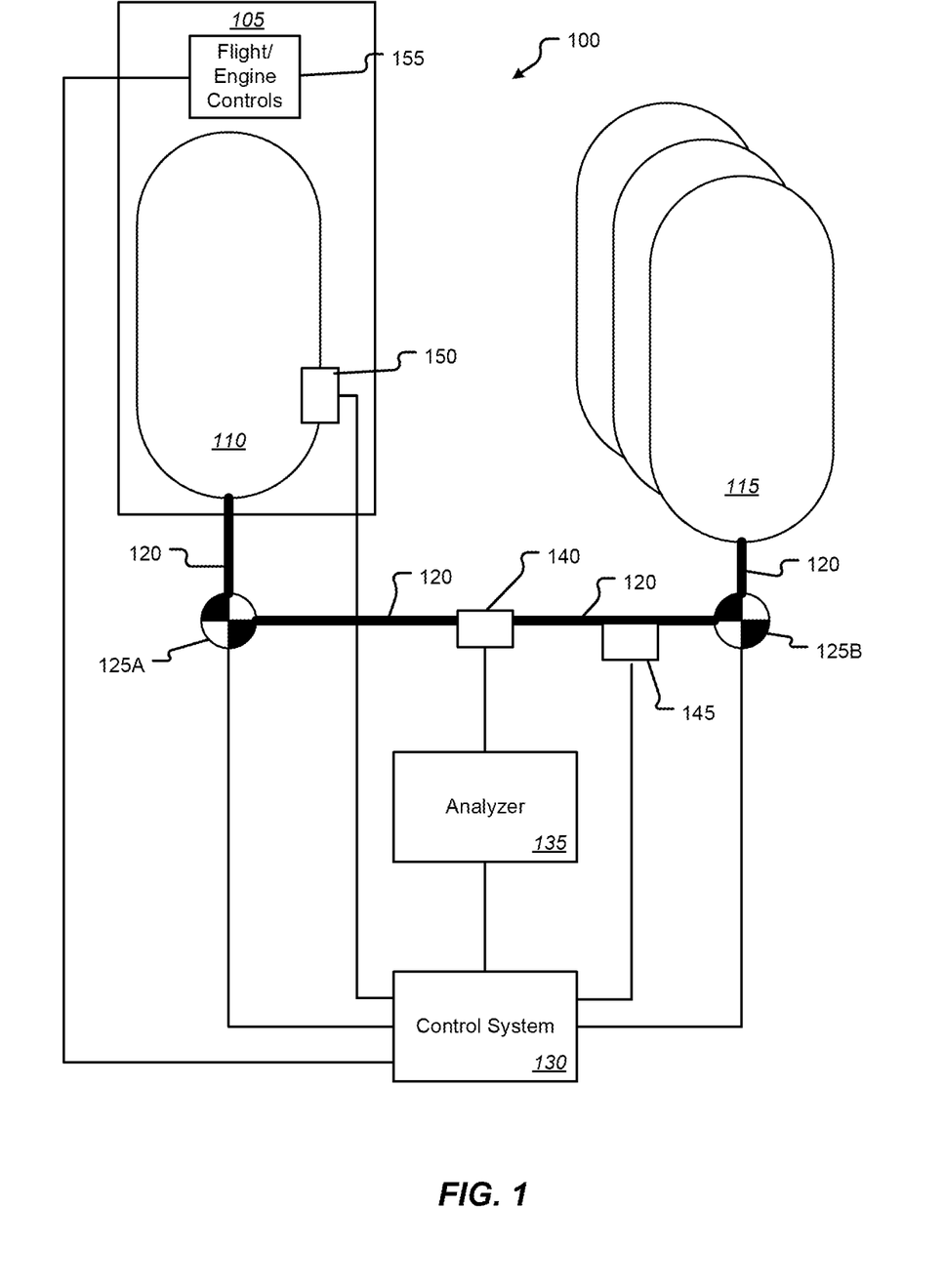
FIG. 1 is a block diagram illustrating elements of an exemplary environment in which embodiments of the present disclosure may be implemented.

FIG. 1 is a block diagram illustrating elements of an exemplary environment in which embodiments of the present disclosure may be implemented. As illustrated in this example, the environment 100 can include a space launch vehicle 105. As known in the art, a fuel tank 110 of the launch vehicle can be loaded with fuel, such as Liquefied (LNG), from supply tanks 115 through one or more fuel lines 120. The flow of fuel from the supply tanks 115 to the tank 110 of the launch vehicle 105 can pass through one or more valves 125A and 125B operated by a control system 130.

According to embodiments of the present disclosure, the control system 130 can be adapted to control the flow of fuel from the supply tanks 115 to the tank 110 of the launch vehicle 105 based on a mass of the fuel and a predefined mass target. In order to do so, a composition and density of the fuel can be determined by the control system 130 while the fuel is being loaded. Accordingly, the control system 130 can be communicatively coupled with an analyzer 135. The analyzer 135 can comprise, for example, a spectroscopic or chromographic analyzer as known in the art. The analyzer 135 can receive from a sensor probe 140 in the fuel lines 120 signals which the analyzer can use to determine a raw composition of the fuel in the fuel lines 120 as known in the art. The analyzer 130 can periodically read raw composition data from the analyzer 135 along with flow values for the fuel lines 120 based on flow sensors 145 in the fuel lines and/or other conditions from sensors 150 on the launch vehicle 105. For example, one or more sensors 150 can also monitor losses from the tank 110, e.g., from venting gas out of the top of the tank 110 or bleeding liquid from the bottom of the tank 110. Based on this information, the control system 130 can control loading of the fuel into the tank 110 of the launch vehicle based on mass of the fuel determined from a composition and density of the fuel determined in real-time while the fueling process is being conducted.

Stated another way, the control system 130 can control a fueling process for the launch vehicle 105 by monitoring a flow of a fuel being loaded into a tank 110 of the launch vehicle 105 during the fueling process and losses out of the tank 110. The control system 130 can determine a mass of the fuel being loaded into the tank 110 of the launch vehicle 105 based on the monitoring of the flow of the fuel into the tank 110 and control the loading of the fuel into the tank 110 of the launch vehicle 105 based on the determined mass of the fuel and a predefined mass loading target for the fuel. In some cases, final composition values can be provided by the control system 130 to flight and/or engine control systems 155 of the launch vehicle 105 for use in controlling engine combustion of the fuel. Additional details of monitoring the flow of fuel, determining the mass of the fuel, and controlling the flow of the fuel will be described below with reference to FIGS. 2-6.

Figure 2:
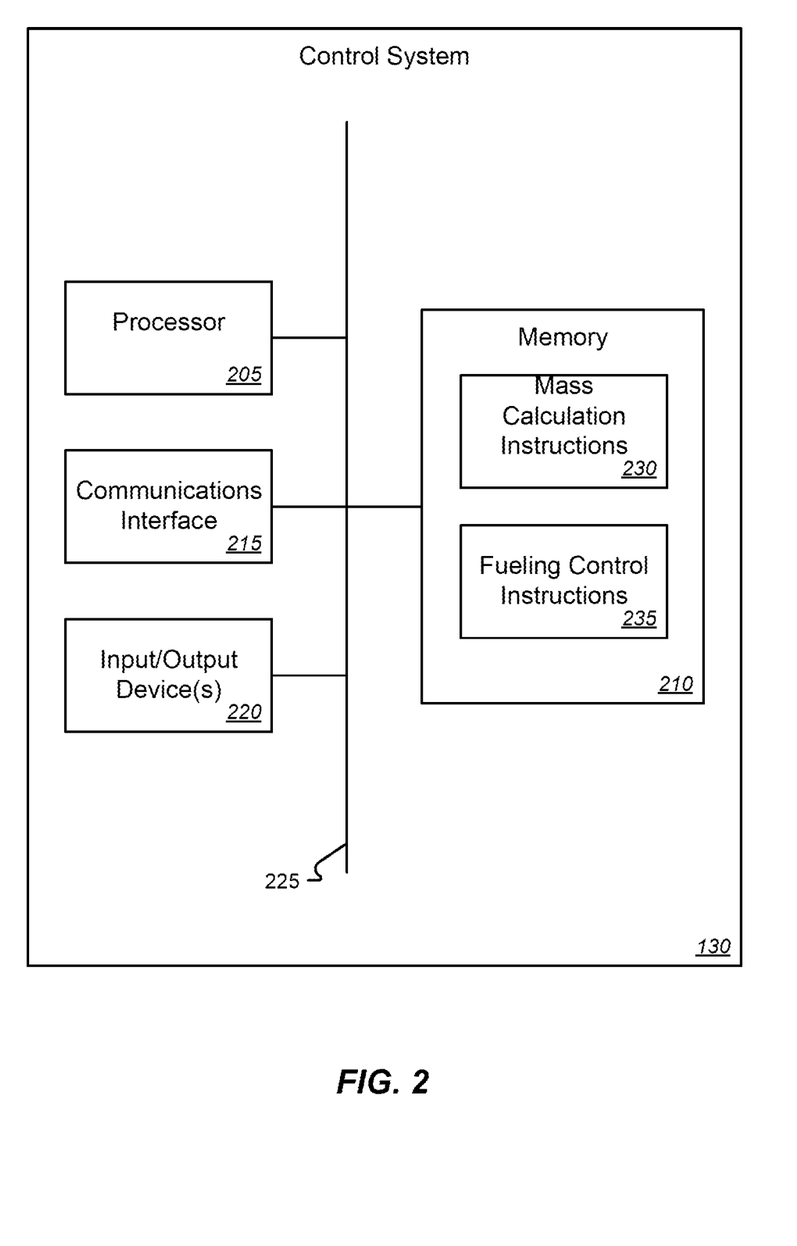
FIG. 2 is a block diagram illustrating elements of an exemplary control system in which embodiments of the present disclosure may be implemented.

FIG. 2 is a block diagram illustrating elements of an exemplary control system in which embodiments of the present disclosure may be implemented. As illustrated in this example, the control system 110 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the control system 110 as described herein.

The memory 210 can be coupled with and readable by the processor 205 via a communications bus 225. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with one or more communications interfaces 215 and one or more input/output devices 220 via the bus 225. The communication interfaces 215 can comprise, for example, Ethernet, Bluetooth, WiFi, or other type of wired or wireless communications interfaces. The input/output devices 220 can comprise, for example, a display such as a Liquid Crystal Display (LCD), Light Emitting Diode (LED), Organic Light Emitting Diode (OLED), display or other type of display for presenting images and other graphics and can be touch sensitive allowing the user to use the display 220 as an input device as well such as any number of sensors, transducers, other monitoring systems and/or devices, etc.

The memory 210 can store therein a set of fueling control instructions 230 which, when executed by the processor 205, causes the processor 205 to monitor a flow of a fuel being loaded into a tank 110 of the launch vehicle 105 during the fueling process. Monitoring the flow of the fuel being loaded into the tank 110 of the launch vehicle 105 can comprise reading, though the communications interfaces 215, from an analyzer, e.g., a spectroscopic or chromographic analyzer, at a periodic time interval, raw composition values for the fuel. Monitoring the flow of the fuel being loaded into the tank 110 of the launch vehicle 105 can also comprise detecting, e.g., by reading one or more sensors or other input/output devices 220 a flow rate for the fuel being loaded into the tank 110 of the launch vehicle.

The memory 210 can also have stored therein a set of mass calculation instructions 230. The mass calculation instructions 230, when executed by the processor 205, can further cause the processor 205 to determine a mass of the fuel being loaded into the tank 110 of the launch vehicle 105 based on the monitoring of the flow of the fuel into the tank. Determining the mass of the fuel being loaded into the tank 110 of the launch vehicle 105 can comprise determining, in real-time, a time dependent composition value for each of a plurality of components of the fuel based on the raw composition values for the fuel and the flow rate for the fuel being loaded into the tank 110 of the launch vehicle. Determining the mass of the fuel being loaded into the tank 110 of the launch vehicle 105 can further comprise determining, in real-time, density term for the fuel being loaded into the tank 110 of the launch vehicle 105 based on the time dependent composition value for each of the plurality of components of the fuel and calculating the mass of the fuel being loaded into the tank 110 of the launch vehicle 105 based on the density term.

The fueling control instructions 235 can further cause the processor 205 to control the loading of the fuel into the tank 110 of the launch vehicle 105 based on the determined mass of the fuel and a predefined mass loading target for the fuel. Controlling the loading of the fuel into the tank 110 of the launch vehicle 105 based on the determined mass of the fuel and a predefined mass loading target for the fuel can comprise calculating, in real-time, a total mass of the fuel loaded into the tank 110 of the launch vehicle 105 based on the density term and the flow rate of the fuel being loaded into the tank 110 of the launch vehicle 105 and determining whether the total mass of the fuel loaded into the tank 110 of the launch vehicle 105 is equal to or greater than the predetermined mass loading target. In response to determining the total mass of the fuel loaded into the tank 110 of the launch vehicle 105 is equal to or greater than the predetermined mass loading target, a flow rate for the fuel being loaded into the vehicle can be adjusted, e.g., changed to a replenish mode to balance losses of fuel from the vehicle.

In some cases, the fueling control instructions 235 can further cause the processor 205 to determine final composition values for the fuel loaded into the tank 110 of the launch vehicle. That is, in addition to the individual time dependent composition value for each of a plurality of components of the fuel determined from the raw composition values collected at the specified time interval, cumulative composition values may be determined from the individual time dependent composition values and maintained for the total fuel in the tank 110 of the launch vehicle. In such cases, the fueling control instructions 235 can also cause the processor 205 to provide the final composition values for the fuel loaded into the tank 110 of the launch vehicle 105 to a flight control system 110 of the launch vehicle. The flight control system 110 of the launch vehicle 105 can then use these values to control the engines of the launch vehicle.

Figure 3:
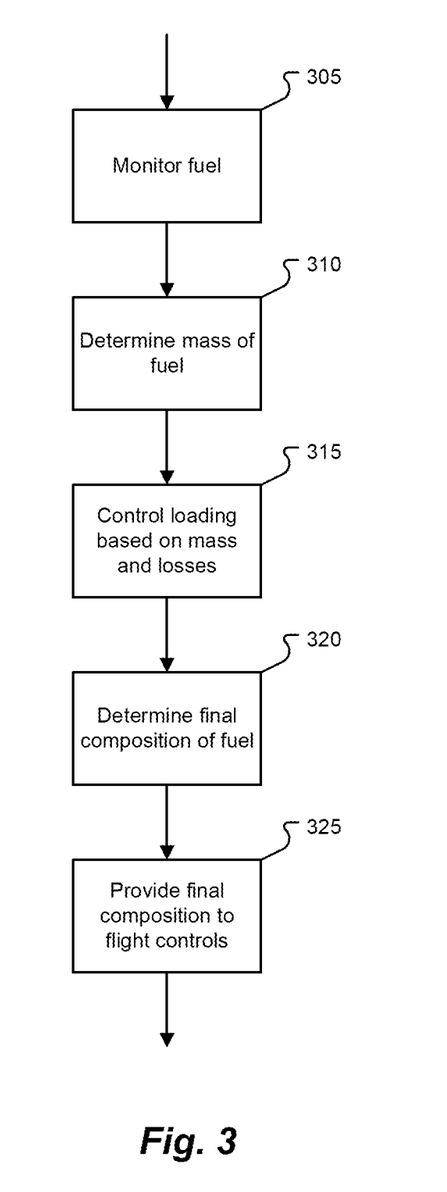
FIG. 3 is a flowchart illustrating an exemplary process for controlling a fueling process for a launch vehicle according to one embodiment of the present disclosure.

FIG. 3 is a flowchart illustrating an exemplary process for controlling a fueling process for a launch vehicle 105 according to one embodiment of the present disclosure. As illustrated in this example, controlling a fueling process for a launch vehicle 105 can comprise monitoring 305 a flow of a fuel being loaded into a tank 110 of the launch vehicle 105 during the fueling process. Details of an exemplary process for monitoring 305 a flow of a fuel being loaded into a tank 110 of the launch vehicle 105 during the fueling process will be described below with reference to FIG. 4.

A mass of the fuel being loaded into the tank 110 of the launch vehicle 105 can be determined 310 based on the monitoring of the flow of the fuel into the tank. Details of an exemplary process for determining 310 the mass of the fuel being loaded into the tank 110 of the launch vehicle 105 will be described below with reference to FIG. 5.

The loading of the fuel into the tank 110 of the launch vehicle 105 can then be controlled 315 based on the determined mass of the fuel, determined losses from the tank of the vehicle, and a predefined mass loading target for the fuel. Details of an exemplary process for controlling 315 the loading of the fuel into the tank 110 of the launch vehicle 105 will be described below with reference to FIG. 6.

In some cases, final composition values of the fuel loaded into the tank 110 of the launch vehicle 105 can be determined 320. In such cases, the final composition values for the fuel loaded into the tank 110 of the launch vehicle 105 can be provided 325 to a flight control system 110 of the launch vehicle.

Figure 4:
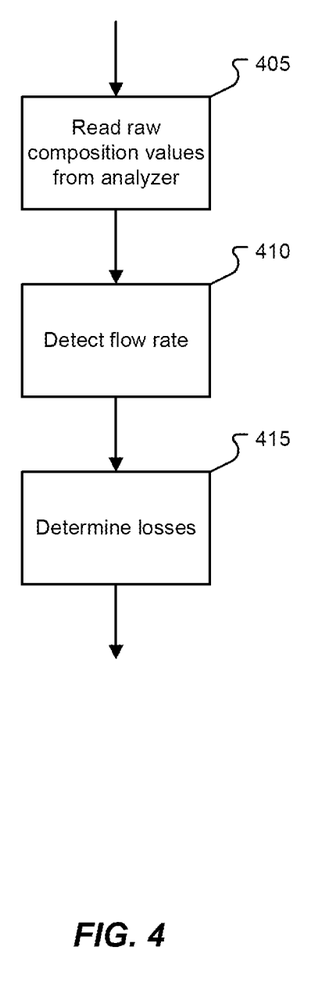
FIG. 4 is a flowchart illustrating an exemplary process for monitoring the flow of the fuel being loaded into the tank of the launch vehicle according to one embodiment of the present disclosure.

FIG. 4 is a flowchart illustrating an exemplary process for monitoring the flow of the fuel being loaded into the tank 110 of the launch vehicle 105 according to one embodiment of the present disclosure. As illustrated in this example, monitoring the flow of the fuel being loaded into the tank 110 of the launch vehicle 105 can comprise reading 405, e.g., from a spectroscopic or chromographic analyzer, at a periodic time interval, raw composition values for the fuel. Monitoring the flow of the fuel being loaded into the tank 110 of the launch vehicle 105 can also comprise detecting 410 a flow rate for the fuel being loaded into the tank 110 of the launch vehicle. Monitoring the flow of the fuel being loaded into the tank 110 of the launch vehicle 105 can also comprise determining 415 losses out of the tank 110 of the launch vehicle 105, e.g., from venting gas out of the top of the tank 110 or bleeding liquid from the bottom of the tank 110.

Figure 5:
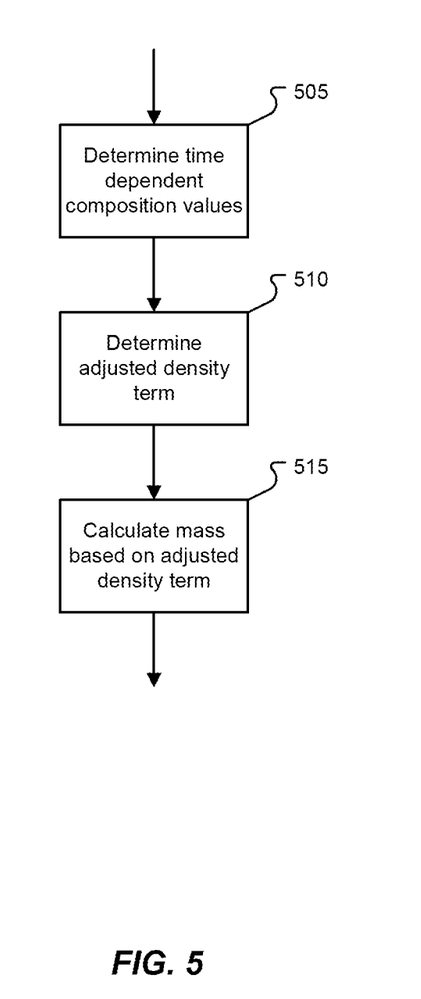
FIG. 5 is a flowchart illustrating an exemplary process for determining the mass of the fuel being loaded into the tank of the launch vehicle according to one embodiment of the present disclosure.

FIG. 5 is a flowchart illustrating an exemplary process for determining the mass of the fuel being loaded into the tank 110 of the launch vehicle 105 according to one embodiment of the present disclosure. As illustrated in this example, determining the mass of the fuel being loaded into the tank 110 of the launch vehicle 105 can comprise determining 505, in real-time, a time dependent composition value for each of a plurality of components of the fuel based on the raw composition values for the fuel and the flow rate for the fuel being loaded into the tank 110 of the launch vehicle. Determining the mass of the fuel being loaded into the tank 110 of the launch vehicle 105 can further comprise determining 510, in real-time, density term for the fuel being loaded into the tank 110 of the launch vehicle 105 based on the time dependent composition value for each of the plurality of components of the fuel and calculating 515 the mass of the fuel being loaded into the tank 110 of the launch vehicle 105 based on the density term.

Figure 6:
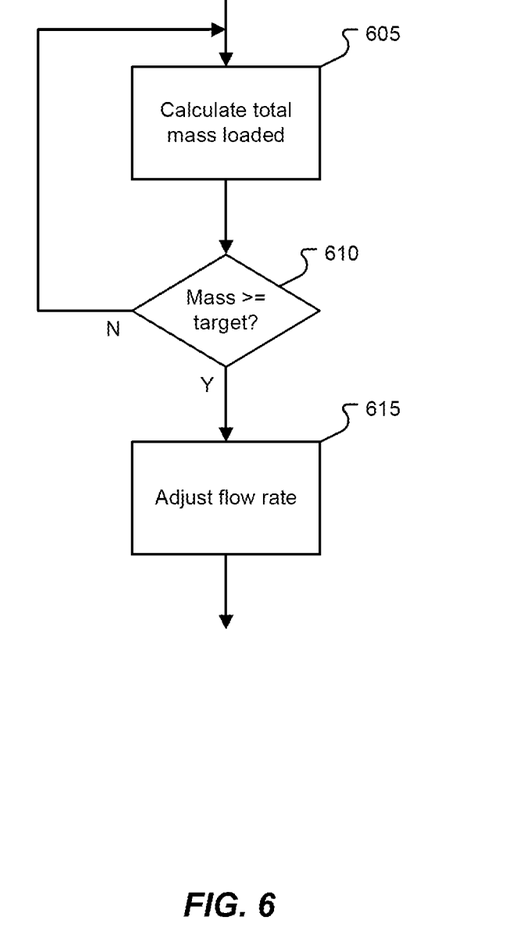
FIG. 6 is a flowchart illustrating an exemplary process for controlling the loading of the fuel into the tank of the launch vehicle according to one embodiment of the present disclosure.

FIG. 6 is a flowchart illustrating an exemplary process for controlling the loading of the fuel into the tank 110 of the launch vehicle 105 according to one embodiment of the present disclosure. As illustrated in this example, controlling the loading of the fuel into the tank 110 of the launch vehicle 105 based on the determined mass of the fuel and a predefined mass loading target for the fuel can comprise calculating 605, in real-time, a total mass of the fuel loaded into the tank 110 of the launch vehicle 105 based on the density term and the flow rate of the fuel being loaded into the tank 110 of the launch vehicle. A determination 610 can then be made as to whether the total mass of the fuel loaded into the tank 110 of the launch vehicle 105 is equal to or greater than the predetermined mass loading target. In response to determining 610 the total mass of the fuel loaded into the tank 110 of the launch vehicle 105 is not equal to or greater than the predetermined mass loading target the loading of the fuel into the tank 110 of the launch vehicle 105 can continue. In response to determining 610 the total mass of the fuel loaded into the tank 110 of the launch vehicle 105 is equal to or greater than the predetermined mass loading target, a flow rate for the fuel being loaded into the vehicle can be adjusted 615, e.g., changed to a replenish mode to balance losses of fuel from the vehicle. It should be understood that this replenish mode can also control the flow of fuel into the vehicle based on the determined mass of the fuel and the mass target as described above.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for controlling a fueling process for a launch vehicle, the method comprising:
    monitoring, by a processor of a control system, a flow of a fuel being loaded into a tank of the launch vehicle during the fueling process, wherein monitoring the flow of the fuel being loaded into the tank of the launch vehicle comprises reading, from a spectroscopic or chromographic analyzer, at a periodic time interval, raw composition values for the fuel;
    determining, by the processor of the control system, a mass of the fuel being loaded into the tank of the launch vehicle based on the monitoring of the flow of the fuel into the tank; and
    controlling, by the processor of the control system, the loading of the fuel into the tank of the launch vehicle based on the determined mass of the fuel and a predefined mass loading target for the fuel.

2. The method of claim 1, wherein monitoring the flow of the fuel being loaded into the tank of the launch vehicle further comprises detecting a flow rate for the fuel being loaded into the tank of the launch vehicle.

3. The method of claim 2, wherein determining the mass of the fuel being loaded into the tank of the launch vehicle comprises determining, in real-time, a time dependent composition value for each of a plurality of components of the fuel based on the raw composition values for the fuel and the flow rate for the fuel being loaded into the tank of the launch vehicle.

4. The method of claim 3, wherein determining the mass of the fuel being loaded into the tank of the launch vehicle further comprises:
    determining, in real-time, density term for the fuel being loaded into the tank of the launch vehicle based on the time dependent composition value for each of the plurality of components of the fuel; and
    calculating the mass of the fuel being loaded into the tank of the launch vehicle based on the density term.

5. The method of claim 4, wherein controlling the loading of the fuel into the tank of the launch vehicle based on the determined mass of the fuel and a predefined mass loading target for the fuel further comprises:

calculating, in real-time, a total mass of the fuel loaded into the tank of the launch vehicle based on the density term and the flow rate of the fuel being loaded into the tank of the launch vehicle;

determining whether the total mass of the fuel loaded into the tank of the launch vehicle is equal to or greater than the predetermined mass loading target; and adjusting a flow rate of the fuel into the tank of the launch vehicle in response to determining the total mass of the fuel loaded into the tank of the launch vehicle is equal to or greater than the predetermined mass loading target.

6. The method of claim 4, further comprising:

determining, by the processor of the control system, final composition values of the fuel loaded into the tank of the launch vehicle; and providing, by the processor of the control system, to a flight control system of the launch vehicle, the final composition values for the fuel loaded into the tank of the launch vehicle.

7. A control system for controlling a fueling process for a launch vehicle, the control system comprising:

a processor; and a memory coupled with and readable by the processor and storing therein a set of instruction which, when executed by the processor, causes the processor to:

monitor a flow of a fuel being loaded into a tank of the launch vehicle during the fueling process, wherein monitoring the flow of the fuel being loaded into the tank of the launch vehicle comprises reading, from a spectroscopic or chromographic analyzer, at a periodic time interval, raw composition values for the fuel;

determine a mass of the fuel being loaded into the tank of the launch vehicle based on the monitoring of the flow of the fuel into the tank; and control the loading of the fuel into the tank of the launch vehicle based on the determined mass of the fuel and a predefined mass loading target for the fuel.

8. The control system of claim 7, wherein monitoring the flow of the fuel being loaded into the tank of the launch vehicle further comprises detecting a flow rate for the fuel being loaded into the tank of the launch vehicle.

9. The control system of claim 8, wherein determining the mass of the fuel being loaded into the tank of the launch vehicle comprises determining, in real-time, a time dependent composition value for each of a plurality of components of the fuel based on the raw composition values for the fuel and the flow rate for the fuel being loaded into the tank of the launch vehicle.

10. The control system of claim 9, wherein determining the mass of the fuel being loaded into the tank of the launch vehicle further comprises:

determining, in real-time, density term for the fuel being loaded into the tank of the launch vehicle based on the time dependent composition value for each of the plurality of components of the fuel; and calculating the mass of the fuel being loaded into the tank of the launch vehicle based on the density term.

11. The control system of claim 10, wherein controlling the loading of the fuel into the tank of the launch vehicle based on the determined mass of the fuel and a predefined mass loading target for the fuel further comprises:

calculating, in real-time, a total mass of the fuel loaded into the tank of the launch vehicle based on the density term and the flow rate of the fuel being loaded into the tank of the launch vehicle;

determining whether the total mass of the fuel loaded into the tank of the launch vehicle is equal to or greater than the predetermined mass loading target; and adjusting a flow rate of the fuel into the tank of the launch vehicle in response to determining the total mass of the fuel loaded into the tank of the launch vehicle is equal to or greater than the predetermined mass loading target.

12. The control system of claim 10, wherein the instructions further cause the processor to:

determine final composition values of the fuel loaded into the tank of the launch vehicle; and provide, to a flight control system of the launch vehicle, the final composition values for the fuel loaded into the tank of the launch vehicle.

13. A non-transitory, computer-readable medium comprising a set of instructions stored therein which, when executed by a processor, causes the processor to control a fueling process for a launch vehicle by:

monitoring a flow of a fuel being loaded into a tank of the launch vehicle during the fueling process, wherein monitoring the flow of the fuel being loaded into the tank of the launch vehicle comprises reading, from a spectroscopic or chromographic analyzer, at a periodic time interval, raw composition values for the fuel;

determining a mass of the fuel being loaded into the tank of the launch vehicle based on the monitoring of the flow of the fuel into the tank; and controlling the loading of the fuel into the tank of the launch vehicle based on the determined mass of the fuel and a predefined mass loading target for the fuel.

14. The non-transitory, computer-readable medium of claim 13, wherein monitoring the flow of the fuel being loaded into the tank of the launch vehicle further comprises detecting a flow rate for the fuel being loaded into the tank of the launch vehicle.

15. The non-transitory, computer-readable medium of claim 14, wherein determining the mass of the fuel being loaded into the tank of the launch vehicle comprises determining, in real-time, a time dependent composition value for each of a plurality of components of the fuel based on the raw composition values for the fuel and the flow rate for the fuel being loaded into the tank of the launch vehicle.

16. The non-transitory, computer-readable medium of claim 15, wherein determining the mass of the fuel being loaded into the tank of the launch vehicle further comprises:

determining, in real-time, density term for the fuel being loaded into the tank of the launch vehicle based on the time dependent composition value for each of the plurality of components of the fuel; and calculating the mass of the fuel being loaded into the tank of the launch vehicle based on the density term.

17. The non-transitory, computer-readable medium of claim 16, wherein controlling the loading of the fuel into the tank of the launch vehicle based on the determined mass of the fuel and a predefined mass loading target for the fuel further comprises:

calculating, in real-time, a total mass of the fuel loaded into the tank of the launch vehicle based on the density term and the flow rate of the fuel being loaded into the tank of the launch vehicle;

determining whether the total mass of the fuel loaded into the tank of the launch vehicle is equal to or greater than the predetermined mass loading target; and adjusting a flow rate of the fuel into the tank of the launch vehicle in response to determining the total mass of the fuel loaded into the tank of the launch vehicle is equal to or greater than the predetermined mass loading target.

* * * * *